United States Patent [19]

Michaels

[11] Patent Number: 5,236,976
[45] Date of Patent: Aug. 17, 1993

[54] POLYESTER RESIN MOLDING COMPOSITION

[75] Inventor: Joseph B. Michaels, Pittsburgh

[73] Assignee: Reichhold Chemicals, Inc., Durham, N.C.

[21] Appl. No.: 654,083

[22] Filed: Feb. 11, 1991

[51] Int. Cl.$^5$ .......................... C08K 3/10; C08K 3/22; C08L 31/00; C08L 31/06
[52] U.S. Cl. ..................................... 523/514; 525/36; 525/39; 525/49
[58] Field of Search .................... 523/514; 525/36, 49, 525/39

[56] References Cited

U.S. PATENT DOCUMENTS

| | | | |
|---|---|---|---|
| 2,757,160 | 7/1956 | Anderson | 525/39 |
| 3,054,770 | 9/1962 | Rogers | 525/39 |
| 4,263,199 | 4/1981 | Atkins | 523/514 |

*Primary Examiner*—John Kight, III
*Assistant Examiner*—Jeffrey Culpeper Mullis
*Attorney, Agent, or Firm*—Rodman & Rodman

[57] ABSTRACT

An unsaturated polyester resin blend which includes at least one polyester resin containing a major amount of dodecanedioic acid and a second polyester resin which does not contain dodecanedioic acid. The polyester blend diluted with a cross-linkable vinyl monomer can be admixed with a thermoplastic low shrink additive, reinforcing fibers, inert filler, metal oxide or hydroxide, and a release agent to formulate sheet molding composition systems especially suitable for molding into exterior automotive parts exhibiting high levels of toughness combined with a Class A appearance.

6 Claims, No Drawings

POLYESTER RESIN MOLDING COMPOSITION

BACKGROUND OF THE INVENTION

1. Field of the Invention

This invention relates to unsaturated polyester resin blends and to their use for the formulation of sheet molding compounds particularly useful for the manufacture of exterior automobile parts exhibiting high levels of toughness combined with Class A or finished sheet metal surface appearance.

2. The Prior Art

Unsaturated polyester resin compositions are extensively used in modern industry for the manufacture of relatively large durable articles of many types. Such compositions include an ethylenically unsaturated polyester resin which is the esterification reaction product of polyhydric alcohols and polycarboxylic compounds such as polycarboxylic acids and polycarboxylic anhydrides wherein at least a portion of the polycarboxylic compounds contain alpha, beta-ethylenic unsaturation.

These unsaturated polyester resins may be used in the formulation of molding compositions, referred to in the art as sheet molding compositions (SMC), which generally comprise an ethylenically unsaturated polyester resin as a major component dissolved in a suitable unsaturated cross-linking monomer containing terminal vinyl groups such as styrene and admixed with one or more thermoplastic resins, curing agents, polymerization inhibitors, catalysts, coloring agents, release agents, fibrous reinforcing materials, thickeners and fillers.

SMC systems can be molded into articles having different shapes and configurations by various molding processes such as compression molding, and injection molding under heat and pressure. One application of the SMC systems which is finding increasing acceptance and demand is in the manufacture of exterior automobile parts such as fenders, doors, tailgates and similar exterior car body parts.

The unsaturated polyester resins useful in preparing SMC systems for automotive applications are generally highly reactive unsaturated polyesters in which the acid component of the polyester consists of a high proportion of an alpha, beta-ethylenically unsaturated dicarboxylic acid. The SMC systems when compression molded at temperatures on the order of 200°–330° F. and pressures of about 700–1500 pounds per square inch (psi) can be formed into exterior automobile body parts which have a surface appearance resembling a finished sheet metal surface.

This finished sheet metal surface appearance is referred to in the art as a "Class A" surface which can be measured quantitatively as a surface number, by utilizing an instrument such as the Budd Surface Analyzer TM which is available from the Budd Company. Other devices can also be used such as the Loria TM (Ashland Co.) and Difracto Sight TM (Difracto Co.).

U.S. Pat. No. 4,540,741 to Corrado discloses alkyds of unsaturated polyesters obtained by reacting (a) 0.4–1.0 moles of an alpha, beta-ethylenically unsaturated acid such as maleic acid (b) 0–0.6 moles of another dicarboxylic acid such as adipic or dodecanedioic (c) 0.5–1.1 moles of a polymeric glycol such as 1,2 dipropylene glycol and (d) 0–0.5 moles of another glycol such as 1,2 propylene glycol. The unsaturated polyester when diluted with a vinyl monomer such as styrene can be used to prepare solid, expanded resinous materials suitable for an SMC system.

U.S. Pat. No. 4,292,218 to Corrado et al discloses polyester resins useful in the manufacture of buttons. The resins are prepared by the esterification of maleic acid optionally together with phthalic acid, adipic acid or dodecanedioic acid with one or more glycols and particularly dipropylene glycol together with 20–30% by weight of the total resin of a vinyl monomer such as styrene.

U.S. Pat. No. 4,276,388 to Iwami et al discloses a molding resin composition useful in the manufacture of car bodies which contains (a) 40–70 parts by weight of an unsaturated polyester formed from at least one alpha, betaunsaturated dibasic acid such as maleic acid or a mixture of saturated acids such as dodecanedioic acid, isophthalic acid and adipic acid reacted with a polyhydric alcohol such as propylene glycol to form an unsaturated polyester component and (b) 60–20 parts by weight of a dialkyl ester of an alkenyl succinic acid and 0–30 parts of an ethylenically unsaturated monomer such as styrene.

Although high reactivity unsaturated polyester resins based on high concentrations of alpha, beta-ethylenically unsaturated dicarboxylic acids are known to the art, these resins when considered for the formulation of SMC systems for exterior automobile body part applications lack the requisite "toughness", that is, the extent to which the body part can absorb energy necessary for applications involving doors, fenders and tailgates.

In the current manufacture of exterior automobile body parts, the industry demands that the body parts have a Class A surface combined with a high level of toughness. Despite their desirability, these combined properties have heretofore been difficult to obtain with conventional SMC systems formulated using highly reactive alpha, beta-ethylenically unsaturated acid based polyester resins. This is because cracking problems are encountered with high reactivity resins especially when the parts are hot, indicating lack of hot strength. The highly reactive resins can also have low impact strength and lack of flexibility.

SUMMARY OF THE INVENTION

In accordance with the present invention, there is provided an unsaturated polyester blend composition suitable for formulating SMC systems for the manufacture of automobile body parts providing high levels of toughness combined with a Class A surface. The resin blend used to manufacture the SMC has a molecular weight/double bond ratio of about 190 to about 280 and comprises:

(a) a first unsaturated polyester composition which is the reaction product of about 50 to about 70 moles of a first alpha, beta-ethylenically unsaturated dicarboxylic acid, about 20 to about 50 moles dodecanedioic acid, about 7 to about 15 moles of a first saturated dicarboxylic acid and about 70 to about 120 moles of a polyhydric alcohol or mixture of polyhydric alcohols; and (b) a second unsaturated polyester composition which is the reaction product of at least about 85 moles of a second alpha, beta-ethylenically unsaturated dicarboxylic acid, 0 to about 15 moles of a second saturated dicarboxylic acid or mixtures of saturated dicarboxylic acids other than dodecanedioic acid, and about 100 to about 110 moles of a dihydric alcohol or mixture of dihydric alcohols.

DESCRIPTION OF THE PREFERRED EMBODIMENTS

The alpha, beta-ethylenically unsaturated dicarboxylic acids which are suitable for reaction to form the aforementioned unsaturated polyester components (a) and (b) of the unsaturated polyester blend of the present invention include maleic acid, fumaric acid, itaconic acid, methyl maleic acid, citraconic acid and the like.

Maleic acid is the alpha, beta-ethylenically unsaturated dicarboxylic acid preferred for use in the preparation of both of the unsaturated polyester resin blend components (a) and (b). The term "dicarboxylic acid" as used herein is intended to also include anhydrides of the respective dicarboxylic acids.

In preparing the unsaturated polyester blend composition of the present invention, it is critical that polyester component (b) of the unsaturated polyester blend contain at least about 85 moles of the alpha, beta ethylenically unsaturated dicarboxylic acid. If polyester component (b) lacks this minimum concentration of alpha, beta-ethylenically unsaturated dicarboxylic acid, the resultant polyester blend composition will be unsuitable for the formulation of SMC systems used in the manufacture of automobile body parts, since the parts molded from such SMC systems will lack the reactivity necessary to provide Class A surface parts.

If the unsaturated acid content of polyester component (b) is substantially greater than about 100 moles, the resultant molded SMC product will be too rigid for use as an automobile body part. Preferably the unsaturated dicarboxylic acid content of polyester component (b) is about 85 to about 100 moles.

Saturated dicarboxylic acids, that is, dicarboxylic acids free from alpha, beta-ethylenic unsaturation which are suitable for use in the present invention other than dodecanedioic acid include aliphatic dicarboxylic or polycarboxylic acids containing from 2 to 12 carbon atoms and cycloaliphatic saturated and unsaturated and aromatic dicarboxylic acids containing from about 8 to 12 carbon atoms or their corresponding anhydrides.

Examples of such acids include adipic acid, glutamic acid, succinic acid or anhydride, phthalic acid, isophthalic acid, terephthalic acid, and endomethylene tetrahydrophthalic anhydride.

Preferably the saturated dicarboxylic acid content of polyester (a) excluding dodecanedioic acid is about 8 to about 12 moles and the preferred saturated acid content of polyester (b) is about zero to about 15 moles. Adipic acid and isophthalic acid are the preferred saturated acids for the preparation of polyester component (b), and are preferably used in a mole ratio of about 1:1 respectively, more specifically, about 7.5 moles adipic acid and about 7.5 moles isophthalic acid in the preferred formulation.

It is also essential to the practice of the present invention that polyester component (a) of the polyester blend composition of the present invention contain about 20 to about 50 moles of dodecanedioic acid and preferably about 25 to about 35 moles. Unless this acid is present in polyester component (a) in the stated concentration the resultant polyester blend composition will be unsuitable for the formulation of SMC systems intended for use in automotive body part manufacture since the molded part will lack the requisite high level of toughness.

Polyhydric alcohols suitable for the preparation of the claimed unsaturated polyester blend compositions include ethylene glycol, diethylene glycol, propylene glycol, 1,2-propylene glycol, dipropylene glycol, 1,4 butanediol, 1,5-pentanediol, 1,6-hexanediol, neopentyl glycol, and the like.

Vinyl monomers suitable for use for cross-linking the polyester blend composition of the present invention include cross-linking monomers containing terminal $CH_2=CH-$ groups such as styrene, ortho, meta, and para alkylstyrenes, divinyl benzene, vinyl toluene, alpha-methyl styrene and the like.

In preparing the unsaturated polyester resin components of the present invention, it is critical that the amounts of reagents for producing the polyester be chosen to obtain resin (b) which has a maleic acid content of at least 85 moles and that the blend of polyester (a) and polyester (b) has a molecular weight/double bond ratio of about 190 to about 280.

The polyesterification reaction for both polyester (a) and polyester (b) is carried out separately at temperatures of about 170° to about 250° C. in the absence or in the presence of aromatic solvents such as xylene or toluene having the function of azeotropic agents, and in an atmosphere of an inert gas such as nitrogen or carbon dioxide.

Catalysts which promote esterification reactions, such as para-toluene sulfonic acid or certain tin compounds, such as dibutyltin oxide can be added to shorten the required reaction time. In the absence of catalysts, the esterification reaction is generally completed in about 12 to 16 hours.

Upon completion of the esterification reaction, a suitable amount of a polymerization inhibitor such as p-hydroquinone, quinone, alkyl phenols and the like can be added to prevent premature gelling and cross-linking. The thus formed unsaturated polyester components (a) and (b) are dissolved in one or more cross-linking vinyl monomers which can contain an appropriate polymerization inhibitor such as parabenzoquinone (PBQ).

The polyester blend composition is curable to a hardened, thermoset condition by the addition of suitable free radical polymerization initiators such as organic peroxy compounds such as tertiary butyl perbenzoate, benzoyl peroxide, dicumyl peroxide and the like. The catalyzed resin compositions are normally heated to obtain more rapid curing.

To prepare compositions suitable for molding and particularly in the formulation of SMC systems, the polyester blend compositions of the present invention are prepared by blending polyester (a) and polyester (b) at weight ratios in parts by weight, of about 20:80 to about 50:50, and preferably about 25:75 to about 40:60, respectively.

When polyester component (a) and polyester component (b) are diluted with a cross-linkable vinyl monomer, preparatory to use as a clear casting system or the formulation of an SMC system, the resulting solution generally contains about 60 to about 80 percent by weight of the blend of polyester components (a) and (b) and about 20 to about 40 percent by weight of the vinyl monomer.

SMC systems and particularly those suitable for automotive applications are formulated containing about 13% to about 20% of the unsaturated polyester blend composition of the present invention, preferably about 13% to about 15%, based on the total SMC compound, and about 4% to about 6% of a cross-linking vinyl monomer, about 40% to about 50% of inert fillers and about 25 to about 35% reinforcing fibers and pigments.

Other materials that can also be included in the SMC system include low shrink thermoplastic additives which function to control the shrinkage of the polyester and a thickening agent such as a metallic oxide or hydroxide which functions to provide desirable molding viscosities.

In formulating SMC systems, the blend of ethylenically unsaturated polyester components (a) and (b) is mixed and diluted with a copolymerizable vinyl monomer which is present in an amount to provide about 0.5 to 0.95 moles of monomer unsaturation per mole of unsaturation in the polyester blend. Styrene and vinyl toluene are preferred vinyl monomers, although other terminal unsaturated monomers can be employed.

Generally the vinyl monomer is employed in amounts ranging from about 25 to about 50 parts by weight per 100 parts of the polyester blend composition and preferably in amounts ranging from about 30 to about 40 parts per 100 parts of the polyester blend composition.

A wide variety of reinforcing fibers are suitable for preparing SMC systems in accordance with the present invention including glass fibers, carbon fibers, sisal fibers, aramid fibers, boron fibers and graphite fibers. Generally reinforcing fibers are incorporated in the SMC formulations in amounts ranging from about 100 to about 140 parts per 100 parts by weight of the polyester blend composition and preferably in amounts ranging from about 110 to about 130 parts per 100 parts of the polyester blend composition.

In formulating SMC systems using the blend of polyester (a) and (b) resins diluted with a vinyl monomer, a free radical polymerization catalyst is present in an amount of at least about 0.5 parts per 100 parts by weight of the polyester blend composition, and preferably about 1.0 to about 2.0 parts per 100 parts by weight of the polyester blend composition.

The free radical polymerization catalyst is added to the uncured SMC system so that upon heating to the catalyst activation temperature, the cross-linking polymerization reaction will commence between the vinyl monomer and the unsaturated polyester resins.

Free radical generating polymerization catalysts suitable for use in the SMC formulations of the present invention include lauroyl peroxide, benzoyl peroxide, cyclohexane peroxide, dicumyl peroxide, 2,2 bis 4,4-ditertiary butyl peroxy cyclohexyl propane, ditertiary butyl peroxide, cumene hydroperoxide, ditertiary butyl peroxide, cumene hydroperoxide, tertiary butyl cumyl peroxide and tertiary butyl perbenzoate and tertiary butyl peroctoate.

Fillers can be added to the uncured SMC system to reduce overall material costs without sacrificing a significant degree of desirable physical properties in the molded part, or to impart or enhance the appearance.

Many different types of fillers can be used such as inorganic fillers, specifically silicates, calcium carbonate, mica, barytes, clay, diatomaceous earth, silica and Fullers earth; and organic fillers such as wood flour, cork dust, cotton flock, wood felt, shredded cornstalks and ground nut shells.

These fillers can be added in amounts ranging from about 170 parts to 230 parts by weight per 100 parts of the polyester blend composition, and preferably in amounts varying from about 180 to about 200 parts per 100 parts of the polyester blend composition.

Pigments can be dispersed in the uncured SMC system to provide desired color. Pigments suitable for this purpose include carbon black, iron oxide, titanium dioxide, zinc oxide and metalic powders and flakes. Pigments can be incorporated in the SMC systems of the present invention in amounts ranging from about 0.2 to about 10.0 parts by weight per 100 parts of the polyester blend composition, and preferably in amounts ranging from about 0.5 to about 1.0 part per 100 parts by weight of the polyester blend composition.

Metallic oxide or hydroxide thickening agents which can be incorporated in the SMC formulations of the present invention include calcium and magnesium oxides and hydroxides and are employed in an amount ranging from about 0.5 to about 5.0 parts per 100 parts of the polyester blend composition and preferably about 1.0 to about 2.0 parts per 100 parts of the polyester blend composition.

Thermoplastic low shrink additives can also be included in the SMC systems of the present invention to control shrinkage of the unsaturated polyester and provide acceptable surface appearance. These additives are generally included in the SMC system in an amount of about 20 to about 50 parts by weight per 100 parts of the polyester blend composition and preferably about 30 to about 40 parts by weight per 100 parts of the polyester blend. Thermoplastic low shrink additives which can be used include thermoplastic urethane elastomers, polyvinyl acetate, polymethylmethracrylate, and the like.

Internal mold release agents such as zinc stearate, calcium stearate, magnesium stearate and organic phosphate esters can also be incorporated in the SMC systems of the present invention in amounts ranging from about 1.0 to about 6.0 parts per 100 parts of the polyester blend compositions and preferably about 3.0 to about 4.0 parts per 100 parts of the polyester blend.

In the manufacture of automobile parts, the inventive polyester compositions can be conveniently molded using standard compression molding techniques. Compression molding of the SMC systems of the present invention can be accomplished at temperatures of about 175° to 330° F. and pressures of about 700 to 1500 psi for a period of about 60 to 120 seconds.

The inventive SMC formulations can be molded into articles having highly desirable surface qualities compared to prior art SMC systems. These SMC moldings have demonstrated equal to or improved Class A surfaces combined with a substantial increase in toughness values, for example, up to 50% higher when compared to conventional SMC automotive parts.

In the following examples, all parts and percentages are by weight unless otherwise noted.

EXAMPLE 1 (RESIN "A")

A first unsaturated polyester blend toughening component designated "polyester resin A" was prepared in accordance with the following procedure:

At room temperature, 1219 grams (50 mole %) dipropylene glycol, 691 grams (50 mole %) propylene glycol, 1254 grams (30 mole %) dodecanedioic acid, 266 grams (10 mole %) adipic acid and 1070 grams (60 mole %) maleic acid were charged into a flask having a capacity of 5 liters and being fitted with stirrer, thermometer, condenser and nitrogen inlet tube. This mixture was esterified at 215° C. Water was distilled until an acid number of 30 was reached in the reaction product. The polyester reaction product was cooled to 170° C. and dissolved in 2150 grams styrene (34.5% by weight of the final product). 0.2 grams hydroquinone (0.0032% by weight of the blend) and 0.1 grams parabenzoquihone (0.0016% by weight of the blend) was added. The mixture thus obtained was clear, had an amber color and had a Brookfield viscosity at 23° C. of 400 cps. The acid number (solids basis) was 25.5. The SPI gel time was 14 minutes, 40 seconds. The storage life at 55° C. was 27 days. The peak temperature was 384° F.

EXAMPLE 2 (RESIN B)

The procedure of Example 1 was repeated to react 85 moles maleic acid with 7.5 moles adipic acid, 7.5 moles isophthalic acid and 106 moles propylene glycol to prepare a polyester reaction product having increased flexibility. The mixture was esterified at 215° C. until an acid number of 30 was reached. The polyester reaction product, designated "polyester resin B", was cooled to 170° C. 2000 grams styrene (35% by weight of the blend), 0.2 grams hydroquinone (0.0032% by weight), and 0.1 gram parabenzoquinone (0.0016% by weight) was added to the product. The mixture obtained was clear and had a 2 color and a viscosity of 1200 cps at 23° C. The acid member (solids basis) was 30. The SPI gel time was 10 minutes. The storage life at 55° C. was greater than 14 days. The peak was 420° F.

EXAMPLE 3

The polyester A from Example 1 was then blended with the high reactivity polyester B from Example 2 at a 30:70 ratio. A total of 63 parts by weight of the combination was incorporated into the SMC composition, with the complete formulation listed in Table 1. 125 mil thick panels were molded from the SMC composition at 1000 psi and 300° F. for two minutes. The properties of this panel are listed in Table 2.

TABLE 1

| Component | Parts by Weight |
| --- | --- |
| Resin B | 44 |
| Resin A | 19 |
| Urethane thermoplastic | 37 |
| (Uralloy TM, Olin Corp.) | |
| Styrene | 10 |
| Tertiary butyl perbenzoate (TSPB) | 1.25 |
| Zn stearate | 3 |
| CaCO3 (filler) | 190 |
| Carbon black dispersion (pigment) | 0.25 |
| MgO thickener | 1.9 |
| Glass fibers | 130 |

TABLE 2

| Physical Properties | |
| --- | --- |
| Tensile strength | 11,970 psi |
| Tensile Modulus | $1.91 \times 10^6$ psi |
| Elongation | 1.42% |
| Flexural strength | 23,730 psi |
| Flexural Modulus | $1.25 \times 10^4$ psi |
| Toughness[1] | 108.6 in-lb./in$^3$ |
| Surface Number[2] | 125 |

[1]Toughness was determined by measuring the area under the stress/strain tensile curve obtained using an Instron Tensile Tester.
[2]Surface number was determined using a Budd Surface Analyzer. A surface number less than 200 is indicative of a Class A surface.

EXAMPLE 4 (RESIN C)

The procedure of Example 1 was repeated to prepare a second unsaturated polyester blend component whereby 100 moles maleic acid was reacted with 106 moles propylene glycol to prepare a high reactivity propylene maleate resin designated "polyester resin C". The mixture was esterified at 215° C. until an acid number of 30 was reached. The propylene maleate was cooled to 170° C. and 2000 grams styrene (35% by weight of the final product), 0.2 gram hydroquinone (0.0032% by weight of the blend) and 0.1 gram parabenzoquinone (0.0016% by weight of the blend) was added. The mixture thus obtained was clear, had a 2 color and a viscosity at 23° C. of 600 centipoise. The acid number (solids basis) was 30. The SPI gel time was 30 minutes. The storage life at 55° C. was 14 days. The peak was 420° F.

The propylene maleate (resin C) was incorporated in an SMC composition with the complete formulation as listed in Table 3.

The SMC formulation was molded to 125 mil thick panels at 1000 psi and 300° F. for 2 minutes. The physical properties are listed in Table 4.

TABLE 3

| Component | Parts by Weight |
| --- | --- |
| Resin C | 63 |
| Urethane thermoplastic | 37 |
| (Uralloy TM, Olin Corp.) | |
| Styrene | 10 |
| Tertiary butyl perbenzoate (TBPB) | 1.25 |
| Zn stearate | 3 |
| CaCO3 (filler) | 190 |
| Carbon black dispersion (pigment) | 0.25 |
| MgO (thickener) | 1.9 |
| Glass fibers | 119 |

TABLE 4

| Physical Properties | |
| --- | --- |
| Tensile strength | 9,600 psi |
| Tensile modulus | $1.48 \times 10^6$ psi |
| Elongation | 1.48% |
| Flexural strength | 21,200 psi |
| Flexural modulus | $1.40 \times 10^4$ psi |
| Toughness | 92 in-lb./inch$^3$ |
| Surface number | 170 |

EXAMPLE 5

Sixty-five percent by weight of a blend consisting of polyester resin A prepared in Example 1 was blended at weight ratios of 80/20 and 70/30 with polyester resins B and C of Examples 2 and 3, respectively. The molecular weight/double bond ratio of the polyester resin blends ranged from 200 to 220 for the polyester B/A blends and 226 to 243 for the polyester C/A blends. Included in these blends was 1% by weight benzoyl peroxide and 35 percent by weight styrene. The prepared clear cast systems were cured into 125 mil panels at 125° F. for 16 hours, 175° F. for one hour and 250° F. for one hour. The physical properties of these panels are listed in Table 5.

For purposes of comparison, clear cast systems were formulated in which polyester resin A was not incorporated in the system. These comparative clear cast systems designated as "B" and "C" were molded into 125 mil panels at 125° F. for 16 hours, 175° F. for one hour, and 250° F. for one hour. The physical properties of these comparative clear cast systems are also recorded in Table 5.

TABLE 5

POLYESTER BLEND BASED CLEAR CAST SYSTEMS

| Polyester Blend Components | Weight Ratio | Tensile Strength, psi | Tensile Modulus × 10⁶, psi | Elongation, % | Flexural Strength, psi | Flexural Modulus × 10⁶, psi | Toughness, in-lb/in.³ |
|---|---|---|---|---|---|---|---|
| B/A | 80/20 | 6532 | 0.455 | 1.84 | 9,562 | 0.417 | 66.05 |
| B/A | 70/30 | 5980 | 0.444 | 1.66 | 10,280 | 0.394 | 55.9 |
| B | — | 4700 | 0.540 | 1.2 | 12,210 | 0.424 | 24.9 |
| C/A | 80/20 | 7874 | 0.425 | 2.66 | 13,040 | 0.366 | 122.7 |
| C/A | 70/30 | 6808 | 0.390 | 2.3 | 11,560 | 0.310 | 92.3 |
| C | — | 7413 | 0.470 | 1.8 | 11,550 | 0.42 | 76.12 |

The data in Table 5 indicates that the clear cast systems based on a blend of polyester A and polyester B, and polyester A and polyester C, exhibit greatly improved toughness especially when compared to equivalent systems based on polyester components B and C alone wherein dodecanedioic acid is absent from the polyester composition.

EXAMPLE 6

An SMC system of increased toughness suitable for the molding of automotive parts was prepared using polyester blends containing varying weight ratios of polyester resin C of Example 3 and polyester resin A of Example 1. Polyester C/A ratios were varied from 80/20 to 50/50. The polyester blends were then mixed with a variety of additives to prepare the SMC system. The complete formulations are listed in Table 6.

TABLE 6

Formulation of C/A Blends

| Component | Parts by Weight |
|---|---|
| C/A blend | 40 |
| Styrene | 23 |
| Tertiary butyl perbenzoate | 1.25 |
| Urethane thermoplastic (Uralloy TM, Olin Corp.) | 37 |
| Zn stearate | 3 |
| CaCO₃ (filler) | 190 |
| Carbon black dispersion (pigment) | 0.2 |
| Glass fibers | 130 |
| MgO (thickener) | 1.9 |

The SMC systems were then molded into 125 mil thick panels at 300° F. and 1000 psi for 120 seconds. The physical properties of these panels and the specific weight ratios of the C/A blends are recorded in Table 7.

For purposes of comparison the procedure of Example 4 was repeated to prepare an SMC system except that 40 parts of polyester C were used with 23 parts styrene and without polyester A. The system was molded into 125 mil thick panels at 300° F. and 1000 psi for 120 seconds. The physical properties of this comparative SMC system designated "Control", are also recorded in Table 7.

TABLE 7

| Physical Property | Polyester C/A Blend (weight ratio) | | | | |
|---|---|---|---|---|---|
| | 80/20 | 70/30 | 60/40 | 50/50 | Control |
| Tensile strength, psi | 10,100 | 11,055 | 11,345 | 11,440 | 9,545 |
| Tensile Modulus × 10⁶ psi | 11.41 | 1.35 | 1.28 | 1.25 | 1.48 |
| Elongation, % | 1.45 | 1.5 | 1.5 | 1.6 | 1.45 |
| Flexural strength, psi | 22,08 | 22,220 | 25,240 | 25,840 | 21,330 |
| Flexural Modulus × 10⁶ psi | 1.4 | 1.33 | 1.30 | 1.27 | 1.40 |
| Un-Notched Izod | 23.3 | 23.9 | 24.3 | 24.7 | 22.6 |
| Surface Number | 162 | 160 | 176 | 198 | 170 |
| Toughness, | 104 | 114 | 121 | 139 | 92 |

TABLE 7-continued

| Physical Property | Polyester C/A Blend (weight ratio) | | | | |
|---|---|---|---|---|---|
| | 80/20 | 70/30 | 60/40 | 50/50 | Control |
| in-lb./in³ | | | | | |
| Improvement, % | 13 | 24 | 31.5 | 51 | — |

With reference to Table 7, it is apparent that SMC systems of greatly increased toughness can be achieved without substantial diminution of Class A appearance by blending maleic acid based polyesters (resin C) with a second maleic acid based polyester containing co-reacted dodecanedioic acid (resin A). The improvement in toughness, ranging from 13 to 51%, increases with the amount of polyester resin A incorporated in the polyester blend component.

EXAMPLE 7

An SMC system combining increased toughness, Class A appearance and flexibility suitable for molding automotive parts was prepared using the formulation in Table 8.

TABLE 8

| Component | Parts by Weight |
|---|---|
| Polyester A | 19 |
| Polyester B | 44 |
| Styrene | 10 |
| Tertiary butyl perbenzoate (TSPB) | 1.25 |
| Urethane thermoplastic (Uralloy TM, Olin Corp.) | 37 |
| Zn stearate | 3 |
| CaCO₃ (filler) | 190 |
| Carbon black dispersion (pigment) | 0.2 |
| MgO (thickener) | 1.9 |
| Glass fibers | 130 |

The viscosity of the formulation was as follows:

| Time | Brookfield* Viscosity (cps) |
|---|---|
| Initial | 35 × 10³ |
| 24 hours | 18 × 10⁶ |
| 5 days | 29.6 × 10⁶ |

*Type HBT-TF 1 RPM

The SMC system was molded into 125 mil thick panels at 300° F. and 1000 psi for 2 minutes, and had the following physical properties:

| Physical Properties | |
|---|---|
| Tensile strength | 11970 psi |
| Tensile Modulus | 1.9 × 10⁶ psi |
| Elongation | 1.42% |
| Flexural Strength | 23730 psi |
| Flexural Modulus | 1.25 × 10⁶ psi |
| Surface Number | 125 |

| Physical Properties | |
| --- | --- |
| Toughness | 108.6 in-lb/in$^3$ |

What is claimed is:

1. A sheet molding composition suitable for the manufacture of exterior automobile parts having improved toughness properties when compared with equivalent compositions without dodecanedioic acid, and a Class A surface appearance, comprising:
  (a) about 20 to 50 parts of a first unsaturated polyester reaction product of about 70 to about 120 moles of a polyhydric alcohol and about 50 to about 70 moles of an alpha, beta-ethylenically unsaturated dicarboxylic acid, about 20 to about 50 moles of dodecanedioic acid and about 7 to about 15 moles of a saturated acid other than dodecanedioic acid,
  (b) about 50 to 80 parts of a second unsaturated polyester reaction product of about 100 to about 110 moles of a polyhydric alcohol and at least about 85 moles of an alpha, beta-ethylenically unsaturated dicarboxylic acid and 0 to about 15 moles of a saturated acid other than dodecanedioic acid,
  (c) about 20 to 40 weight % of (a)+(b) of a vinyl monomer copolymerizable with polyester reaction products (a) and (b),
  (d) a thermoplastic low shrink additive,
  (e) an inert filler,
  (f) A reinforcing fiber,
  (g) a free radical polymerization catalyst,
  (h) a metallic oxide or hydroxide thickening agent, and
  (i) a release agent.

2. The sheet molding composition of claim 1, wherein the thermoplastic low shrink additive is incorporated in the composition at a concentration of from about 20 to about 50 parts per 100 parts of the polyester composition.

3. The sheet molding composition of claim 1, wherein the filler is incorporated in the composition at a concentration of from about 170 to about 200 parts per 100 parts of the polyester composition.

4. The sheet molding composition of claim 1, wherein the reinforcing fiber is incorporated in the composition at a concentration of from about 120 to 140 parts per 100 parts of the polyester composition of claim 1.

5. The sheet molding composition of claim 1, wherein the thickening agent is incorporated in the composition at a concentration of from about 1 to about 3 parts per 100 parts by weight of (a), (b) and (c).

6. An exterior automobile part formed from the sheet molding composition of claim 1.

* * * * *